US00H002288H

(19) United States
(12) Statutory Invention Registration
Montalbano

(10) Reg. No.: US H2288 H
(43) Published: Jan. 7, 2014

(54) UNIFORM SHEAR VALVE FOR AN EXTRUSION MACHINE

(71) Applicant: Davis-Standard, LLC, Pawcatuck, CT (US)

(72) Inventor: John A. Montalbano, Constantia, NY (US)

(73) Assignee: Davis-Standard, LLC, Pawcatuck, CT (US)

(21) Appl. No.: 13/836,322

(22) Filed: Mar. 15, 2013

(51) Int. Cl.
*B29C 47/00* (2006.01)

(52) U.S. Cl.
USPC ..... 425/113

(58) Field of Classification Search
USPC ..... 425/113
See application file for complete search history.

(56) References Cited

U.S. PATENT DOCUMENTS 3,253,300 A * 5/1966 Gove et al. ..... 165/64
4,367,190 A * 1/1983 Beach ..... 264/171.19

* cited by examiner

*Primary Examiner* — Daniel Pihulic
(74) *Attorney, Agent, or Firm* — Michaud-Kinney Group LLP

(57) ABSTRACT

A uniform shear valve for an extruder machine includes a body having a generally annular wall that defines an interior area extending along a longitudinal axis thereof. The interior area extends between an inlet proximate a first end of the body and a second end of the body. The second end is opposite the first end. The body has a first bore extending through the wall along a traverse axis substantially perpendicular to the longitudinal axis at a first position and second position. A flow control member is sealingly and slidingly positioned partially in the first bore at the first position and extends out of the body. The flow control member defines a first seat on an end thereof. An outlet is located in the first bore at the second position. A second seat is positioned proximate the outlet and is concentric with the first seat along the traverse axis. A uniform flow area is defined by a gap between the first seat and the second seat.

5 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

UNIFORM SHEAR VALVE FOR AN EXTRUSION MACHINE

FIELD OF THE INVENTION

The present invention relates to the field of control of the flow of polymer materials discharged from an extrusion machine and in particular to a valve which creates uniform shear flow of the polymer through the valve to eliminate melt fracture and melt memory effects in a polymer flowing therethough.

BACKGROUND OF THE INVENTION

Extrusion devices are used to melt, blend, and form materials, such as plastics and polymers, into a desired shape. Typical extrusion devices include a rotating screw housed coaxially within a heated, cylindrically-shaped feed throat and barrel. A portion of the feed throat is cut away forming an opening for admission of materials. A hopper is coupled to the extrusion device for feeding the material through the opening, into the feed throat and subsequently into the barrel. The screw rotates within the feed throat and barrel and drives the material therethrough. The extrusion material is forced through a flanged discharge port at a discharge end of the barrel and into a downstream into a die or aperture.

One of the basic problems that has plagued polymer industry is that when the polymer exits too fast from an extruder or through flow restrictions, such as in valves, a surface of the extruded polymer starts to exhibit undulations or irregularities. The undulations become progressively stronger as the flowrate increases. At even higher flow rates, the distortions can become so severe that they cause the extrudate to break, which is referred to as melt fracture. Melt memory relates to the elasticity of the melted polymer and can also affect the quality of the extruded polymer.

As illustrated in FIG. 1, the prior art extrusion machine 10, includes a valve 100 mounted on a discharge flange 11 of the extrusion machine 10 via a coupling 113. The valve 100 includes a body 110 having an inlet 112 and an outlet 114. The outlet 114 is positioned proximate an opposing end 116 of the inlet 112 and is oriented at an angle of about ninety (90) degrees from the inlet 112. The opposing end 116 has an opening 118 therein and that is coaxial with the inlet 112 relative to a longitudinal axis L. A generally cylindrical plug 120 having a bore 121 extending therethrough is positioned in the opening 118. The plug 120 defines a flange 122 formed on a distal end thereof. The flange 122 is secured to the opposing end 116 of the valve 100 with suitable fasteners 123. The plug 120 also defines a body portion 124 that extends partially into an interior area 100A defined by the valve 100. The body portion 124 defines a radially inward tapered surface 126 that extends from one end 124A of the body portion 124 towards the flange 120 and terminates therebetween by transitioning into a constant diameter D defined by the bore 121. A screen pack 133 is positioned in the interior area 100A between the inlet 112 and the end 124A of the plug 120.

Referring to FIG. 1, a flow control member 130 extends into the bore 121 concentrically with the longitudinal axis L. The flow control member 130 defines a tapered end 132 that is positioned in the bore 121. The flow control member 130 translates along the longitudinal axis L in the bore 121 and a through packing gland 140. The flow control member 130 controls the flow of high pressure polymer material discharged from the extrusion machine 10, as described below. The flow control member 130 can be moved by a suitable operator, such as a hand-wheel. The packing gland 140 includes packing 142 which is compressed between walls of the bore 121 and an exterior surface 130E of the of the flow control member 130. The packing 142 is compressed by a packing follower 144 that is moveably secured to the end 116 of the valve 100 by suitable fasteners 145, for example packing gland bolts.

Referring to FIGS. 1 and 2, the outlet 114 defines a first opening 151 and a radially inward and axially outward tapered surface 152. The tapered surface 152 extends between the first opening 151 and a transition point 153 of constant diameter of an outlet port 154. There is a non-uniform flow area 160 defined at an intersection of the flow control member 130 and the general area defined by the outlet 114, for example, proximate the first opening 151.

During operation of the extrusion machine 10 and prior art valve 100 of FIGS. 1 and 2, high pressure extruded polymer is discharged into the inlet 112 at a high pressure (e.g., 2200 psi). The flow control device 130 is selectively positioned in the bore 121 and over the outlet 114 to control the flow of the polymer into the outlet 114 thereby reducing the pressure of the polymer to about 250 psi. As the polymer flows through the non-uniform flow area 160 creating areas of high local shear 160A, 160B, 160C and 160D. The areas of high local shear 160A, 160B, 160C and 160D can create melt fracture and melt memory effects which cause profile disturbances in the polymer.

In addition, movement of the control member 130 is difficult because of the high pressure in the interior area 100A which the flow control member 130 acts against.

SUMMARY OF THE INVENTION

According to aspects illustrated herein, there is provided a uniform shear valve for an extruder machine. The uniform shear valve includes a body having a generally annular wall that defines an interior area extending along a longitudinal axis thereof. The interior area extends between an inlet proximate a first end of the body and a second end of the body. The second end is opposite the first end. The body has a first bore extending through the wall along a traverse axis substantially perpendicular to the longitudinal axis at a first position and second position. A flow control member is sealingly and slidingly positioned partially in the first bore at the first position and extends out of the body. The flow control member defines a first seat on an end thereof. An outlet is located in the first bore at the second position. A second seat is positioned proximate the outlet and is concentric with the first seat along the traverse axis. A uniform flow area is defined by a gap between the first seat and the second seat.

According to another aspect illustrated herein, the uniform flow area is configured to eliminate melt fracture and melt memory effects in a fluid flowing therethough.

BRIEF DESCRIPTION OF THE DRAWINGS

FIG. 2 is top view of a portion of the prior art valve taken across the line 2-2 of FIG. 1;

DETAILED DESCRIPTION OF THE INVENTION

Figure 3:
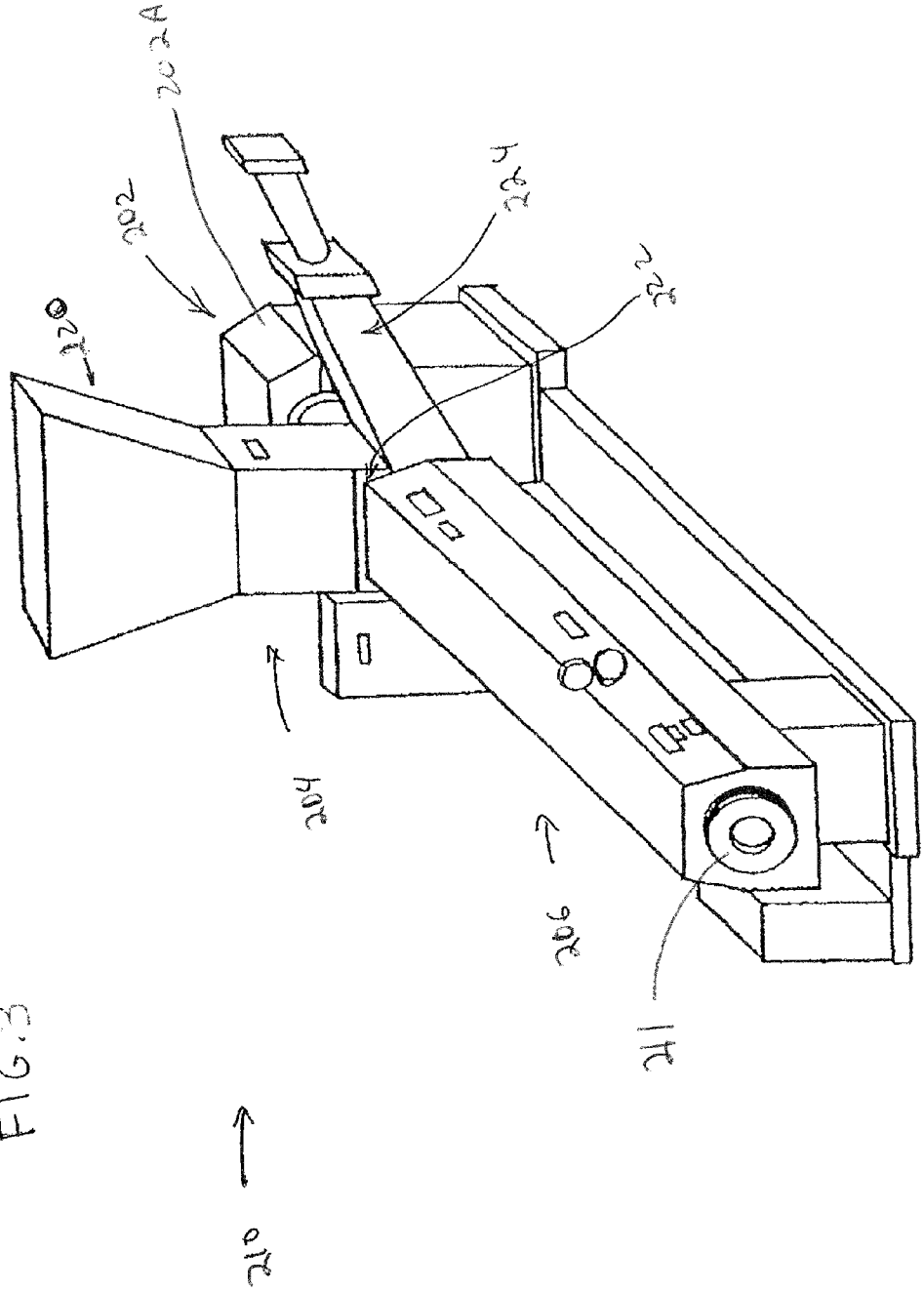
FIG. 3 is a perspective view of an extruder.

In reference to FIG. 3, an extrusion machine is generally designated by the numeral 210. The extrusion machine 210 includes a drive section 202, a feed section 204 and an extrusion section 206 with the feed section 204 disposed between the drive section 202 and the extrusion section 206. An extruder screw 288 as shown in cross section view of FIG. 4, has one end supported by and connected to a drive shaft (not shown) disposed within the drive section 202 shown in FIG. 3. The drive section 202 includes a gear box 202A that is driven by a suitable driver (not shown) (e.g., a hydraulic drive system or a motor) that rotates gears (not shown) in the gear box 202A, the shaft and the screw 288. The screw 288 is also supported in the extrusion section 206 by a suitable bearing (not shown) such as a journal bearing. The extrusion machine 210 defines a discharge flange 211 for discharging high pressure (e.g., 2200 psi) extruded polymer therethrough and into a uniform shear valve 200 as illustrated in FIG. 4.

Figure 4:
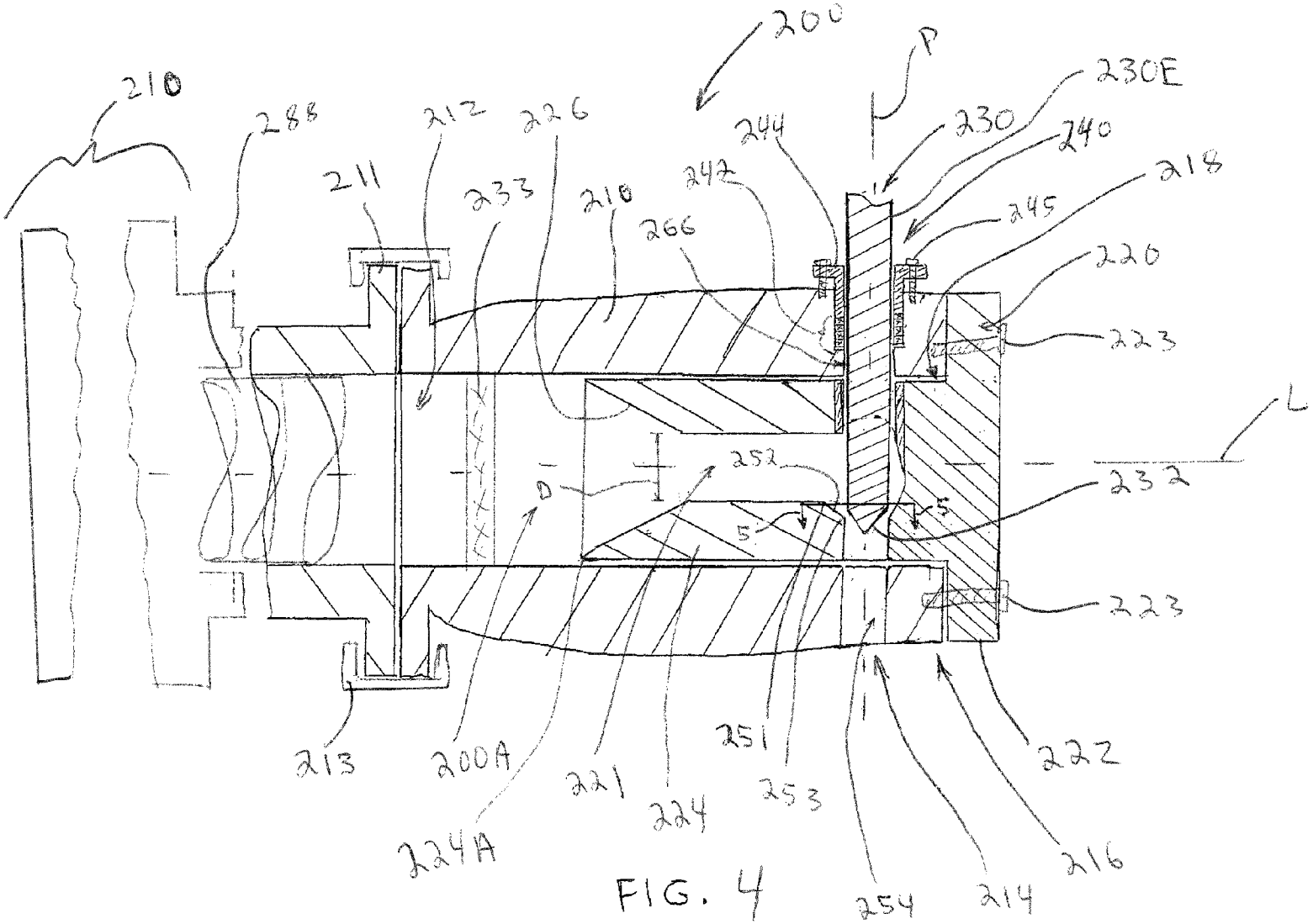
FIG. 4 is a cross sectional view of uniform shear valve of the present invention shown mounted on a discharge flange of the extruder of FIG. 3.

As illustrated in FIG. 4, the extrusion machine 210, includes a uniform shear valve 200 mounted on a discharge flange 211 of the extrusion machine 210 via coupling 213. The valve 200 includes a body 210 having an inlet 212 and an outlet 214. The outlet 214 is positioned proximate an opposing end 216 of the inlet 212 and is oriented at an angle of about ninety (90) degrees from the inlet 212. The opposing end 216 has an opening 218 therein and that is coaxial with the inlet 212 relative to a longitudinal axis L. A generally cylindrical plug 220 having a bore 221 extending partially therethrough is positioned in the opening 218. The plug 220 defines a closed end flange 222 formed on a distal end thereof. The bore 221 terminates at the closed end flange 222. The closed end flange 222 is secured to the opposing end 216 of the uniform shear valve 200 with suitable fasteners 223. The plug 220 also defines a body portion 224 that extends partially into an interior area 200A defined by the uniform shear valve 200. The body portion 224 defines a radially inward tapered surface 226 that extends from one end 224A of the body portion 224 towards the flange 220 and terminates therebetween by transitioning into a constant diameter D defined by the bore 221. A screen pack 233 is positioned in the interior area 200A between the inlet 212 and the end 224A of the plug 220. While the body 210 is described as having the opening 218 with the plug positioned therein, the present invention is not limited in this regard as the body 210 may be formed with the second end 218 closed and the plug 220 formed integrally with the body.

Referring to FIG. 4, a flow control member 230 extends traversely into the bore 121 through a side bore 266 along an axis P that is substantially perpendicular to the longitudinal axis L. The flow control member 230 and the side bore 266 are aligned coaxially with the outlet 214. The flow control member 230 defines a tapered end 232, for example a seat that traverses across the bore 221 and into an opening 251 defined by the body portion 224 of the plug 220. The flow control member 230 translates along the longitudinal axis P in the side bore 266 and a through packing gland 240. The flow control member 230 controls the flow of high pressure polymer material discharged from the extrusion machine 210, as described below. The flow control member 230 is selectively positionable, for example, is moved by a suitable operator, such as a hand-wheel or motor operated actuator. The packing gland 240 includes packing 242 which is compressed between walls of the side bore 266 and an exterior surface 230E of the of the flow control member 230. The packing 242 is compressed by a packing follower 244 that is moveably secured to a portion of the body 210 of the uniform shear valve 200 proximate the side bore 266, by suitable fasteners 245, for example packing gland bolts.

Figure 5:
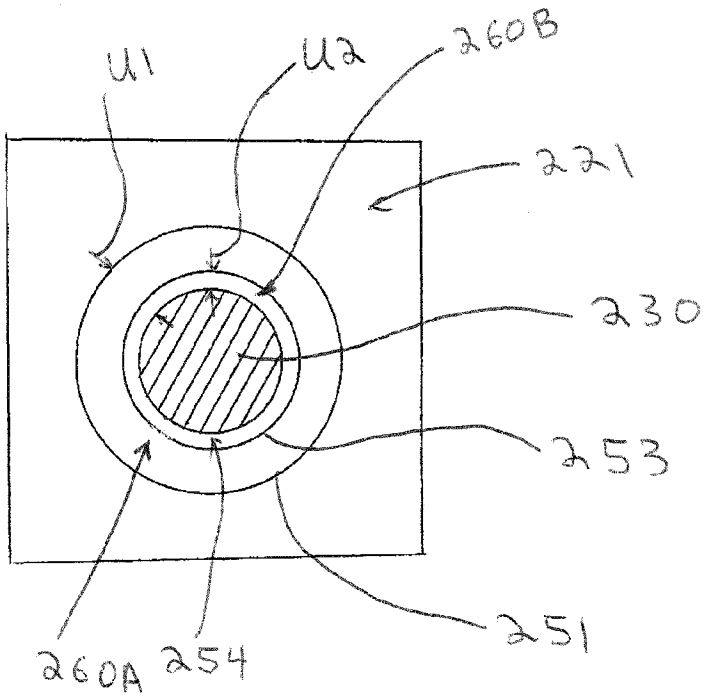
FIG. 5 is a top view of a portion of the uniform shear valve of FIG. 4 taken across the line 4-4 of FIG. 1.

Referring to FIGS. 4 and 5, the outlet 214 defines the first opening 251 and a radially inward and axially outward tapered surface 252, for example a seat. The tapered surface 252 extends between the first opening 251 and a transition point 253 of constant diameter of an outlet port 254. There is a uniform flow area 260A defined between the exterior surface 230E of the flow control member 230 and the first opening 251. The uniform flow area 260A defines annular gap between the exterior surface 230E of the flow control member 230 and the first opening 251 having a radially measured width of U1. The uniform flow area 160 is decreased in magnitude, but maintains its uniformity, as the flow control member 230 is inserted further towards the outlet port 254, thereby establishing other uniform flow areas. For example, a uniform flow area 260B is defined between the outer surface 230E of the flow control member 230 and the transition point 253 of constant diameter of an outlet port 254. The uniform flow area 260B defines annular gap between the outer surface 230E of the flow control member 230 and the transition point 253 of constant diameter of an outlet port 254 having a radially measured width of U2. In addition, a uniform flow area and annular gap of constant a radially measured width are defined between: 1) a circumferential section of the tapered end 232 and the tapered surface 252; 2) a circumferential section of the tapered end 232 and the opening 251; and 3) a circumferential section of the tapered end 232 and the transition point 253 of constant diameter of an outlet port 254.

Figure 1:
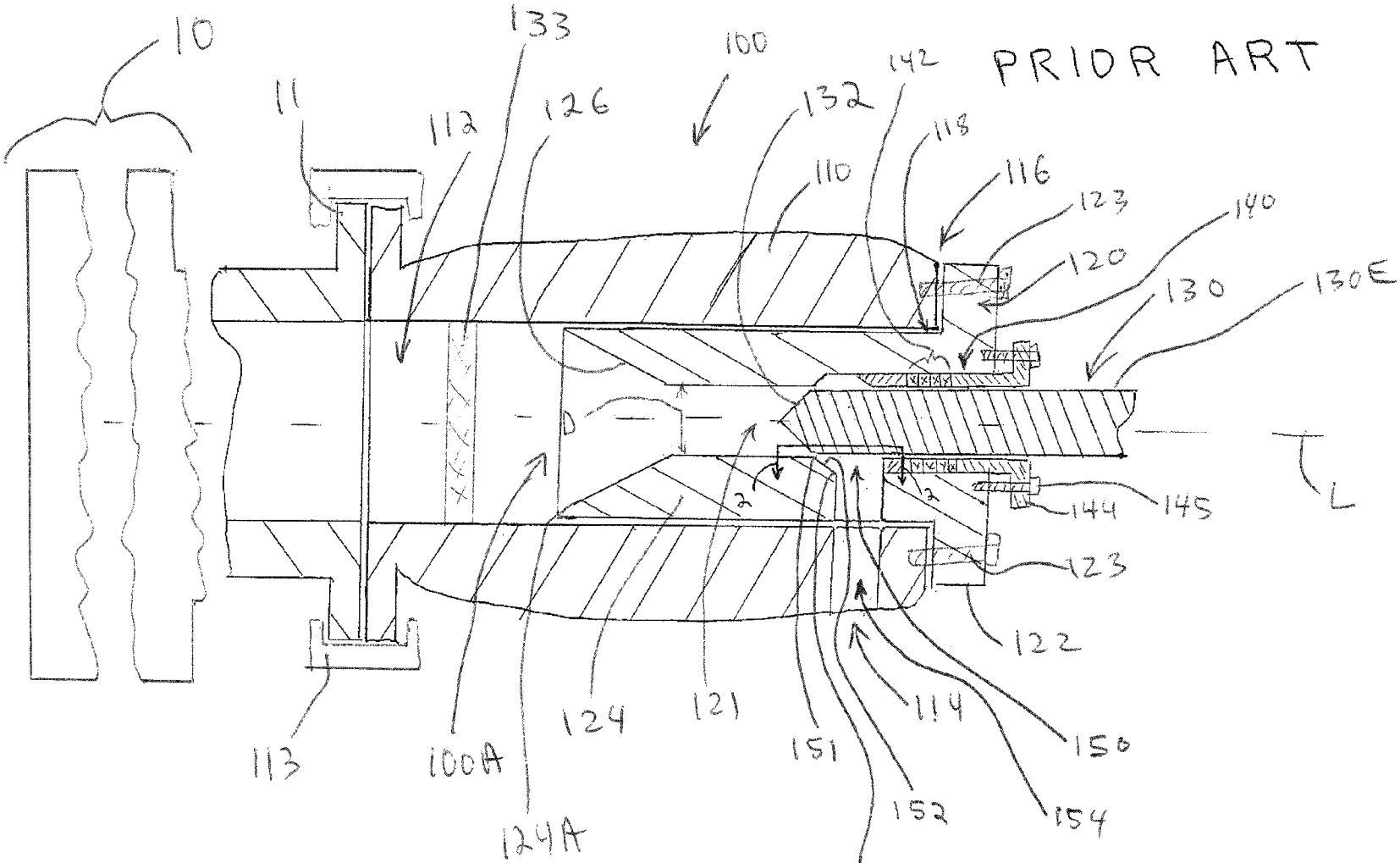
FIG. 1 is a cross sectional view of a prior art valve shown mounted on a discharge flange of an extruder.
Figure 8:
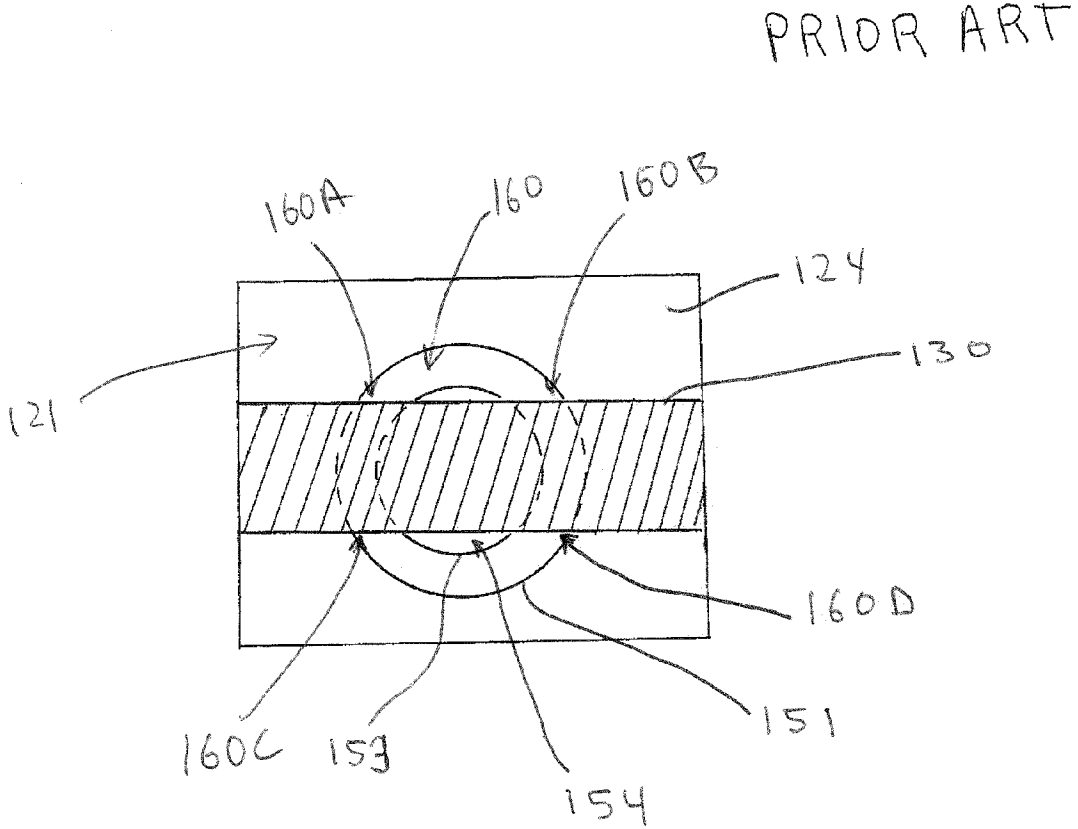
Figure 6:
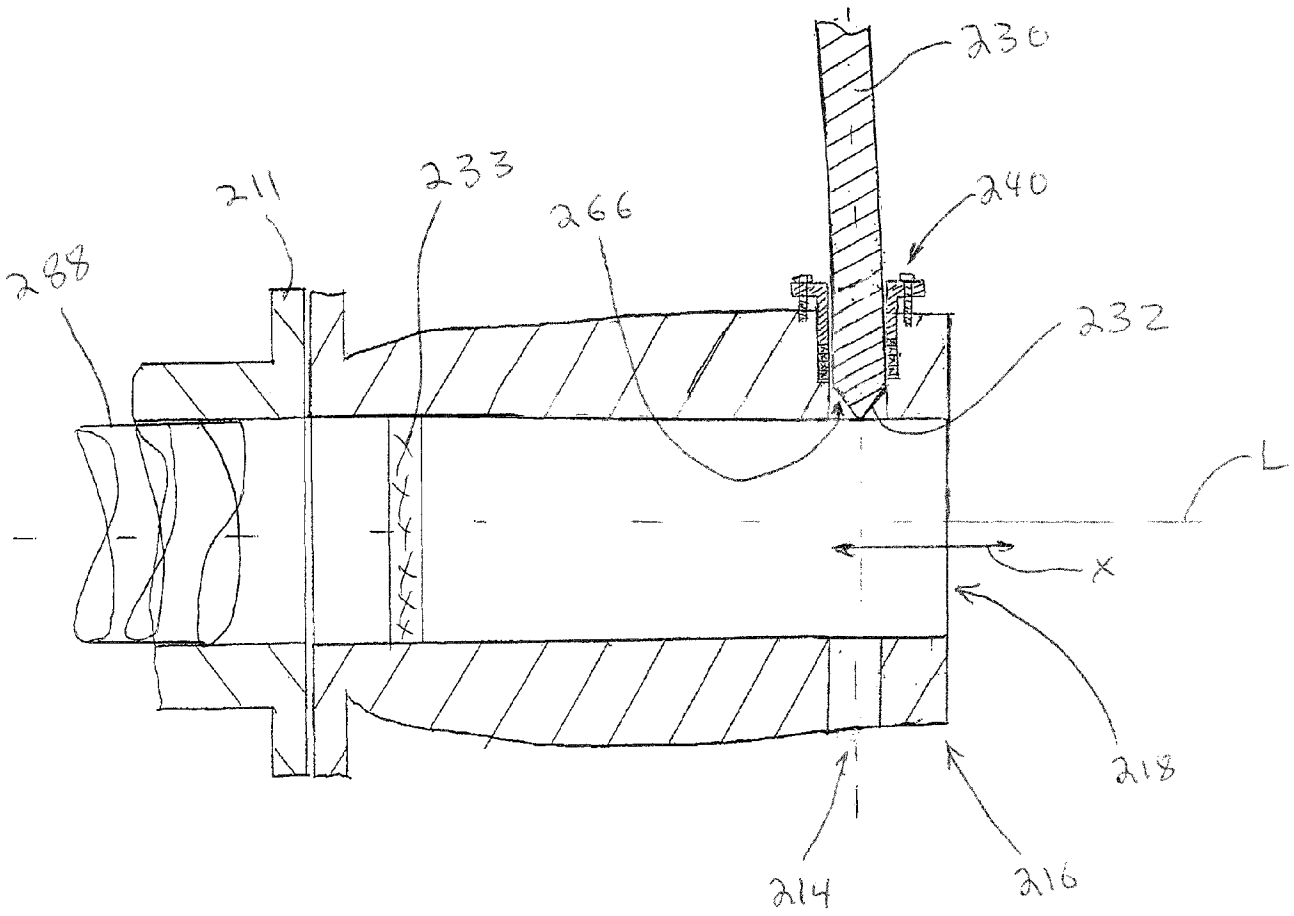
FIG. 6 is a cross sectional view of uniform shear valve of FIG. 4 with the plug removed.

During operation of the extrusion machine 210 and uniform shear valve 200 of FIGS. 4-6, high pressure extruded polymer is discharged into the inlet 212 at a high pressure (e.g., 2200 psi). The flow control member 230 is selectively positioned along the axis P and the flow control member 230 and the tapered end 232 are caused to traverse the bore 221 and move towards or away from the outlet 214. Thus the flow control member 230 and the tapered end 232 control the flow of the polymer into the outlet 214 thereby reducing the pressure of the polymer to about 250 psi. As the polymer flows through the -uniform flow areas 260A, 260B uniform shear of the polymer is created. The uniform shear eliminates any melt fracture and melt memory effects which typically cause profile disturbances in the polymer. In addition, movement of the control member 230 is requires less force to operate compared to the prior art valve 100 of FIG. 1 because of the pressure acting on the flow control member 230 is the downstream reduced pressure (e.g., 250 psi) rather than the high pressure (e.g., 2200 psi) from the extrusion device 210 discharge. Thus the position of the flow control member 230 is controllable via an automated controller and actuator such as a computer processor that controls a motor operator which is in communication with and controls the position of the flow control member 230.

Referring to FIG. 6 the uniform shear valve 200 is shown with the plug 220 removed. During maintenance, the plug 220 can be removed more easily than the plug 120 of the prior art valve 100, because there is no flow control member 230 positioned in the plug 220. In addition, the screen pack 233 and the extruder screw 288 can also be easily removed and/or replaced for maintenance, through the opening 218 in the direction shown by the arrow X.

Although the present invention has been disclosed and described with reference to certain embodiments thereof, it should be noted that other variations and modifications may be made, and it is intended that the following claims cover the variations and modifications within the true scope of the invention.

What is claimed is:

1. A uniform shear valve for an extruder machine comprising:

a body having a generally annular wall that defines an interior area extending along a longitudinal axis thereof, between an inlet proximate a first end of the body and a second end of the body, the second end being opposite the first end, the body having a first bore extending through the wall along a traverse axis substantially perpendicular to the longitudinal axis at a first position and second position, a flow control member sealingly and slidingly positioned partially in the first bore at the first position and extending out of the body, the flow control member defining a first seat on an end thereof;

an outlet located in the first bore at the second position;

a second seat positioned proximate the outlet and being concentric with the first seat along the traverse axis; and a uniform flow area defined by a gap between the first seat and the second seat.

2. The uniform shear valve of claim 1, further comprising an opening in the body at the second end and a plug positioned in and sealing the opening, the plug defining a second bore therethrough that is concentric with the traverse axis, the seat being formed in the second bore.

3. The uniform shear valve of claim 2, wherein the plug defines a third bore aligned with a longitudinal axis of the body, the third bore comprising a tapered surface extending from an inlet of the third bore.

4. The uniform shear valve of claim 1, wherein the flow control member is selectively positionable to vary a magnitude of the uniform flow area.

5. The uniform shear valve of claim 1, wherein the uniform flow area is configured to eliminate melt fracture and melt memory effects in a fluid flowing therethough.

* * * * *